（12） United States Patent
Le Goff et al.

(10) Patent No.: US 8,148,288 B2
(45) Date of Patent: Apr. 3, 2012

(54) BIMETALLIC OR MULTI-METALLIC CATALYST THAT HAS AN OPTIMIZED BIMETALLICITY INDEX AND AN OPTIMIZED HYDROGEN ADSORPTION CAPACITY

(75) Inventors: Pierre-Yves Le Goff, Paris (FR); Fabienne Le Peltier, Rueil Malmaison (FR); Jean Giraud, Salindres (FR); Sylvie Lacombe, Vernaison (FR); Christophe Chau, Rueil Malmaison (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 78 days.

(21) Appl. No.: 12/520,702

(22) PCT Filed: Dec. 7, 2007

(86) PCT No.: PCT/FR2007/002023
§ 371 (c)(1),
(2), (4) Date: Oct. 20, 2009

(87) PCT Pub. No.: WO2008/087273
PCT Pub. Date: Jul. 24, 2008

(65) Prior Publication Data
US 2010/0048389 A1    Feb. 25, 2010

(30) Foreign Application Priority Data

Dec. 22, 2006  (FR) ..................... 06 11407

(51) Int. Cl.
| | |
|---|---|
| *B01J 21/06* | (2006.01) |
| *B01J 27/185* | (2006.01) |
| *B01J 27/135* | (2006.01) |
| *B01J 27/13* | (2006.01) |
| *B01J 23/00* | (2006.01) |
| *B01J 23/42* | (2006.01) |
| *B01J 23/44* | (2006.01) |
| *C10G 57/00* | (2006.01) |
| *C10G 69/02* | (2006.01) |
| *C10G 35/04* | (2006.01) |
| *C10G 59/02* | (2006.01) |
| *C10G 35/06* | (2006.01) |
| *C10G 63/02* | (2006.01) |
| *C10G 69/08* | (2006.01) |
| *C10G 35/00* | (2006.01) |

(52) U.S. Cl. ........ 502/224; 502/213; 502/227; 502/230; 502/325; 502/339; 208/64; 208/65; 208/66; 208/133; 208/134; 208/139

(58) Field of Classification Search .................. 502/213, 502/224, 227, 230, 325, 339; 208/64–66, 208/133, 134, 139
See application file for complete search history.

(56) References Cited

U.S. PATENT DOCUMENTS 4,367,137 A * 1/1983 Antos et al. .................. 208/139
(Continued)

FOREIGN PATENT DOCUMENTS

EP    0 183 861 A1    6/1986
(Continued)

OTHER PUBLICATIONS

International Search Report of PCT/FR2007/002023 (Jul. 7, 2008).
(Continued)

*Primary Examiner* — Patricia L Hailey
(74) *Attorney, Agent, or Firm* — Millen, White, Zelano & Branigan, P.C.

(57) ABSTRACT

The invention relates to a catalyst that comprises a metal M from the group of platinum, at least one promoter X1 that is selected from the group that consists of tin, germanium, and lead, and optionally at least one promoter X2 that is selected from the group that consists of gallium, indium and thallium, a halogenated compound and a porous substrate, in which the atomic ratio X1/M and optionally X2/M is between 0.3 and 8, the $H_{ir}$/M ratio that is measured by hydrogen adsorption is greater than 0.40, and the bimetallicity index BMI that is measured by hydrogen/oxygen titration is greater than 108. The invention also relates to the process for the preparation of this catalyst and a reforming process using said catalyst.

28 Claims, 1 Drawing Sheet

U.S. PATENT DOCUMENTS

| | | | |
|---|---|---|---|
| 4,487,848 A * | 12/1984 | Robinson et al. | 502/223 |
| 4,929,332 A * | 5/1990 | Moser et al. | 208/65 |
| 6,624,116 B1 | 9/2003 | Bharadwaj et al. | |
| 7,541,309 B2 * | 6/2009 | Trevino et al. | 502/325 |
| 2006/0243641 A1 * | 11/2006 | Zhou et al. | 208/135 |
| 2010/0168493 A1 * | 7/2010 | Le Peltier et al. | 585/660 |

FOREIGN PATENT DOCUMENTS

| | | |
|---|---|---|
| FR | 2 091 114 A | 1/1972 |
| FR | 2910346 A1 * | 6/2008 |
| FR | 2910347 A1 * | 6/2008 |

OTHER PUBLICATIONS

F.M. Dautzenberg et al. "Conversion of n-Hexane Over Monofunctional Supported and Unsupported PtSn Catalysts", Journal of Catalysis, vol. 63 (1980) pp. 119-128.

A. Furcht et al., "n-Octane Reforming Over Modified Catalysts I. The Role of Sn, Te and Bi Under Industrial Conditions", Applied Catalysis A: General, vol. 226 (2002) pp. 155-161.

* cited by examiner

BIMETALLIC OR MULTI-METALLIC CATALYST THAT HAS AN OPTIMIZED BIMETALLICITY INDEX AND AN OPTIMIZED HYDROGEN ADSORPTION CAPACITY

FIELD OF THE INVENTION

This invention relates to the field of the conversion of hydrocarbons and more specifically the reforming of hydrocarbon feedstocks in the presence of a catalyst for producing gasoline fractions. The invention also relates to the improved catalytic formulations that are based on a metal from the platinum group and that can be used for this conversion, as well as their method of preparation.

PRIOR ART

Numerous patents describe the addition of promoter to platinum-based catalysts so as to improve their performance level in reforming hydrocarbon feedstocks. Thus, the U.S. Pat. No. 2,814,599 describes the addition of promoters, such as gallium, indium, scandium, yttrium, lanthanum, thallium or actinium to platinum- or palladium-based catalysts.

The U.S. Pat. No. 4,522,935 describes reforming catalysts that comprise platinum, tin, indium, and a halogenated compound and that are deposited on a substrate in which the indium/platinum atomic ratio is greater than 1.14.

The U.S. Pat. Nos. 4,964,975, 6,600,082 B2 and 6,605,566 B2 describe usable platinum- and tin-based catalysts in processes for reforming or dehydrogenation.

The patent FR 2 840 548 describes a catalyst in the form of a homogeneous bed of particles comprising an amorphous matrix, at least one noble metal, at least one halogen, and at least one additional metal. This additional metal is preferably selected from the group that consists of tin, germanium, lead, gallium, indium, thallium, rhenium, manganese, chromium, molybdenum and tungsten.

SUMMARY OF THE INVENTION

This invention relates to the field of bimetallic or multimetallic catalysts that are based on a noble metal and that can be used in a catalytic reforming process.

The invention relates to a catalyst that comprises a metal M from the platinum group, at least one promoter X1 that is selected from the group that consists of tin, germanium, and lead, and optionally at least one promoter X2 that is selected from the group that consists of gallium, indium and thallium, a halogenated compound, and a porous substrate, in which the X1/M atomic ratio—and optionally the X2/M atomic ratio—is between 0.3 and 8, the $H_{ir}/M$ ratio that is measured by hydrogen adsorption is greater than 0.40, and the bimetallicity index BMI that is measured by hydrogen/oxygen titration is greater than 108.

We have actually discovered that the thus defined catalysts lead to improved catalytic performance levels. The invention also relates to the method for preparation of this catalyst and the process for catalytic reforming in the presence of these catalysts.

DETAILED DESCRIPTION OF THE INVENTION

This invention relates to a catalyst that comprises a metal M from the platinum group, at least one promoter X1 that is selected from the group that consists of tin, germanium, and lead, a halogenated compound, and a porous substrate, in which the X1/M atomic ratio is between 0.3 and 8.

Preferably, the X1/M ratio is between 0.7 and 5, more preferably between 0.8 and 4, even more preferably between 1.0 and 3.0, and very preferably between 1.0 and 2.9, and even between 1.2 and 2.6.

The catalyst according to the invention can also optionally comprise at least one promoter X2 that is selected from the group that consists of gallium, indium and thallium. Preferably, the X2/M ratio is then between 0.5 and 6, more preferably said ratio is between 0.8 and 5, even more preferably said ratio is between 0.9 and 4, and very preferably between 1.1 and 4, and even between 1.1 and 3.5.

The catalyst according to the invention preferably contains 0.01 to 5% by weight of metal M from the platinum group, more preferably 0.01 to 2% by weight of metal M, and even more preferably 0.1 to 1% by weight of metal M. Preferably, the metal M is platinum or palladium, and very preferably platinum.

The content of promoter X1 or X2 is preferably between 0.005 to 10% by weight, more preferably between 0.01 and 5% by weight, and very preferably between 0.1 and 2% by weight.

Preferably, the promoter X1 is selected from among tin and germanium. Preferably, the promoter X2 is indium. The catalyst according to the invention can optionally comprise two promoters such as, for example, tin and indium or germanium and indium. Very preferably, these are then tin and indium.

According to one variant, the catalyst according to the invention can therefore comprise only one promoter X1, and preferably X1 is tin.

According to another variant, the catalyst according to the invention can comprise both a promoter X1 and a promoter X2, and preferably X1 is tin and X2 is indium.

When the catalyst comprises both at least one promoter X1 and at least one promoter X2, the atomic ratio (X1+X2)/M is preferably between 0.3 and 8, more preferably between 0.8 and 7, and even more preferably between 1.4 and 7, very preferably between 1.4 and 6.0, and even between 2.0 and 5.5.

The catalyst can optionally also comprise phosphorus. Preferred catalysts according to the invention therefore can comprise, for example, tin and phosphorus, or tin and gallium and phosphorus, or else tin and indium and phosphorus. Very preferably, these are then tin and phosphorus. When the catalyst contains phosphorus, the phosphorus content is preferably between 0.01 and 5% by weight, and more preferably between 0.05 and 2% by weight, and even between 0.05 and 1% by weight.

When the catalyst according to the invention contains tin, the tin content is preferably between 0.1 and 2% by weight, and very preferably between 0.1 and 0.7% by weight and even between 0.1 and 0.5% by weight.

When the catalyst according to the invention contains indium mixed with other promoters X1 or X2, such as, for example, tin or gallium, the indium content is preferably between 0.05 and 3% by weight, more preferably between 0.1 and 2% by weight, and even more preferably between 0.2 and 2% by weight, and even between 0.25 and 1% by weight.

The halogenated compound (or halogen) is preferably selected from the group that consists of: fluorine, chlorine, bromine and iodine. Preferably, the catalyst contains 0.1 to 15% by weight of halogen, more preferably 0.2 to 8% by weight, even more preferably 0.5 to 5% by weight. The chlorine is the very preferred halogen, and, in this case, the catalyst according to the invention very preferably contains 0.5 to 2% by weight, and even 0.7 to 1.5% by weight of chlorine.

The catalyst according to the invention furthermore has a hydrogen adsorption capacity such that the ratio between the quantity of irreversibly adsorbed hydrogen and the metal from the platinum group (also called $H_{ir}/M$ atomic ratio) is greater than 0.40, preferably greater than 0.43, more preferably between 0.43 and 0.9, even more preferably between 0.45 and 0.8, and very preferably between 0.45 and 0.65.

Measurement of the $H_{irr}/M$ Ratio

The $H_{ir}/M$ ratio of a catalyst according to the invention is determined by means of the hydrogen chemisorption technique. This technique is known to one skilled in the art and is described in, for example, Chapter 5, page 127 ff of the survey book entitled: "Catalytic Naphtha Reforming, Science and Technology, by G. J. Antos, A. M. Aitani and J. M. Parera, Editor Marcel Decker, 1995. It actually makes it possible to characterize complex systems based on platinum or other metals and one or more promoters.

Various protocols have been proposed in the literature to determine the quantities of chemisorbed hydrogen. Hydrogen can be chemisorbed by a metal catalyst in a reversible or irreversible manner. The detailed protocol presented below is preferred for the determination of the $H_{ir}/M$ ratio according to the invention that causes the chemisorbed hydrogen quantity $H_{ir}$ to occur in an irreversible way.

Protocol for Treatment of the Sample:
  a) Calcination under a flow of dry air for 2 hours at 500° C.
  b) Transfer of air at ambient temperature for charging into the volumetric measuring cell in less than 10 minutes.
  c) Reduction in the cell with increase in temperature by 20° C. to 450° C. in 1 hour, holding at 450° C. for 4 hours under a hydrogen flow (50 ml.min$^{-1}$), return to 25° C. under hydrogen, then sealing of the air vent of the cell.

Adsorption Measurements:
The apparatus that is used is a static volumetric analysis apparatus.
  a) Desorption under dynamic vacuum (10$^{-5}$ mbar or 1 mPa) at 350° C., for 3 hours then return to 25° C. under vacuum.
  b) Measurement of the adsorbed hydrogen quantity at 25° C. under a given hydrogen pressure, after adsorption for 60 minutes.

The phases a) and b) are reproduced so as to trace the adsorption isotherm between about 40 and 300 mbar (4 to 30 kPa).

Two measurements are made in desorbent under vacuum at 25° C. for 3 hours that make it possible to measure the adsorbed hydrogen quantity in a reversible manner.

Figure 1:
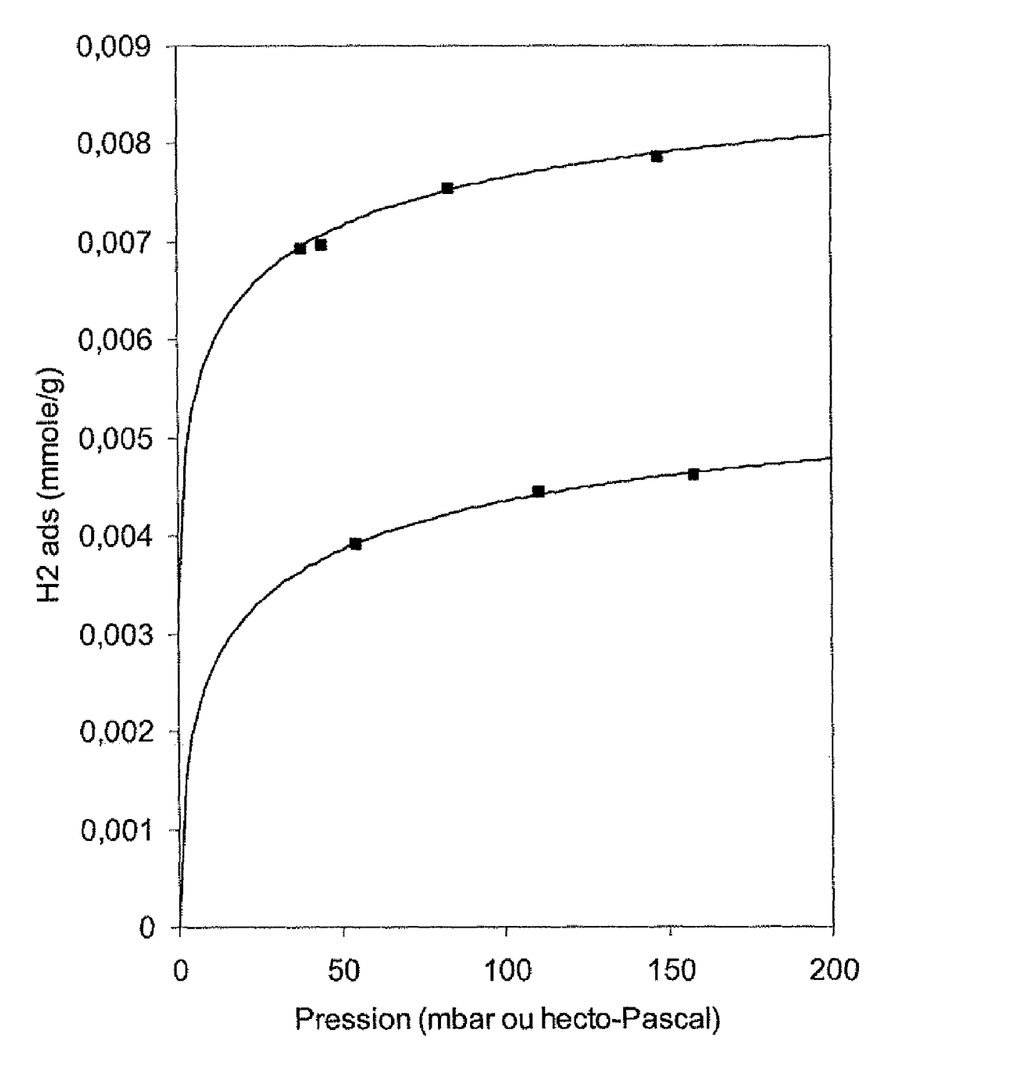

FIGURE 1 shows an isotherm example obtained for a catalyst according to the invention. The curve of the bottom corresponds to the reversible adsorption isotherm and the curve of the top shows the total adsorption isotherm.

It is possible to establish a model of the adsorption isotherm by allowing a dissociative adsorption of hydrogen on platinum, according to the Langmuir equation, with an irreversible portion $H_{ir}$ at 25° C. and a reversible portion $H_{rev}$.

The total quantity of adsorbed hydrogen is defined by the equation (I) below:

$$Q_{ads}=H_{ir}+H_{rev} \cdot (K_1 \cdot P)^{0.5}/(1+(K_1 \cdot P)^{0.5}) \qquad (I)$$

where P is the pressure that is expressed in mbar (or hectopascal), and $K_1$ is the Langmuir constant. The establishment of a model of the adsorption isotherm therefore makes it possible to determine the parameter $H_{ir}$.

Bimetallicity Index:

The optimized catalyst according to the invention has a bimetallicity index (BMI) that is greater than 108. This index that is defined below is measured by the hydrogen/oxygen titration technique. Preferably, this BMI index is greater than 110 and very preferably greater than 115, and even 120. Furthermore, according to a very preferred variant, this index is less than 170 and even more preferably less than 160, and even less than 150. Furthermore, it is possible according to another preferred variant that this index is between 108 and 160, or very preferably between 110 and 160, and even between 110 and 150, or else between 115 and 145.

The bimetallicity index (BMI) is determined by using the hydrogen-oxygen titration technique in a special way. This technique is known to one skilled in the art for determining the dispersion of a metal, i.e., the ratio of the number of surface atoms of one metal to the total number of atoms of this same metal. It is described in, for example, Chapter 5, pages 130 and 131 of the survey book entitled "Catalytic Naphtha Reforming, Science and Technology," by G. J. Antos, A. M. Aitani and J. M. Parera, Editor Marcel Decker, 1995. It consists in chemisorbing oxygen on a metal M that is contained in a previously reduced catalyst and therefore containing a chemisorbed hydrogen layer. The stoichiometric reaction that shows the titration stage of the hydrogen that is chemisorbed by oxygen is considered as being the following:

$$M-H+\tfrac{3}{4}O_2 \rightarrow M-O+\tfrac{1}{2}H_2O$$

The quantity of oxygen consumed during titration makes it possible to determine the quantity of accessible metal sites. In the case of a supported Pt—Sn bimetallic system, it was shown, for example by Sharma et al. in Applied Catalysis A 168 (1998) 251, that by operating two successive oxygen titration cycles, the quantity of oxygen adsorbed during the first cycle was more significant than that adsorbed during the second cycle. This is explained by the fact that during the first cycle, the reduction of tin contributes to the consumption of oxygen, whereas the second cycle essentially reflects the chemisorption of oxygen on the accessible platinum sites.

This second cycle can be used to determine the dispersion of the metal M. In the catalyst according to the invention, the dispersion of the metal M is preferably greater than 80%, more preferably greater than 90%, and very preferably greater than 95%.

The bimetallicity index called "BMI" that is used as a criterion in this invention is calculated from the volume of oxygen that is consumed during the first hydrogen-oxygen titration. It is calculated as follows:

$$BMI=(V1/24041)*4/3/(0.01 T_M/MM)$$

with
  V1: Volume of oxygen consumed during the first titration at 20° C. on the previously reduced catalyst, expressed in cm$^3$ per gram of catalyst.
  $T_M$: Metal content of the platinum group in the catalyst, expressed in % by weight
  MM: Molar mass of the metal from the platinum group The bimetallicity index reflects the degree of interaction of the metal from the platinum group with any promoter that is present in the catalyst. The preferred experimental protocol of hydrogen-oxygen titration for the determination of the bimetallicity index is as follows:
  a) Calcination of 2 grams of catalyst under a dry air flow (20 ml/minute) with a flow rate of 1 Nl/(g·h) for 2 hours at 500° C.,
  b) Return to 20° C. under dry air,
  c) Purging by an inert gas (20 ml/minute), preferably helium with a purity of more than 99.999%,
  d) Transfer under hydrogen (20 ml/minute), preferably with a purity of more than 99.999% and reduction at 500° C. for 2 hours e) Return to 20° C.
f) Purging by an inert gas (20 ml/minute), preferably helium with a purity of more than 99.999%,
g) Oxygen pulses with a volume of 0.27 cm$^3$, preferably with a purity of greater than 99.995%, and purified by means of one or more molecular sieves (sieve 3A, 4A or 13X) at 20° C. until there is no longer oxygen consumption or after at least 10 pulses of constant surface area.

The volume of oxygen consumed during stage g) is used for the calculation of the bimetallicity index.

Substrate of the Catalyst According to the Invention:

The porous substrate that is used in the catalyst according to the invention is generally a refractory oxide that is selected from among the oxides of magnesium, titanium, zirconium, alumina, silicon or mixture thereof. Preferably, it is silica, alumina or silica-alumina, and very preferably alumina.

According to the invention, said porous substrate advantageously comes in the form of balls, extrudates, pellets, or powder. Very advantageously, said substrate comes in the form of balls or extrudates. The pore volume of the substrate is preferably between 0.1 and 1.5 cm$^3$/g, more preferably between 0.4 and 0.8 cm$^3$/g. Furthermore, said porous substrate has a specific surface area advantageously of between 50 and 600 m$^2$/g, preferably between 100 and 400 m$^2$/g, and even between 150 and 300 m$^2$/g.

Preparation of the Catalyst According to the Invention:

It was discovered by the applicant that the catalysts according to the invention were obtained in particular by depositing the promoter X1 twice (two separate stages), a first stage before the introduction of the element of the platinum group, and a second stage after the introduction of the element of the platinum group.

The process for preparation of the catalyst according to the invention generally comprises the following stages:
a) Introduction of the promoter X1 into the substrate or on the substrate,
b) Optional drying stage of the product that is obtained at the end of stage a,
c) Calcination of the product that is obtained in stage a or optionally in stage b at a temperature that is preferably between 350 and 650° C.,
d) Deposition of at least one metal from the platinum group M,
e) Optional drying under neutral atmosphere or atmosphere containing oxygen, at a moderate temperature that preferably does not exceed 150° C.,
f) Deposition of a complementary fraction of the promoter X1 on the product that is obtained in stage d or e,
g) Optional drying of the product that is obtained in stage f,
h) Calcination of the product that is obtained in stage f or g; this calcination is preferably conducted in the presence of air, and this air can also be enriched with oxygen or nitrogen.

More specifically, for the first stage (stage a) for introducing the promoter X1 (used by itself or in a mixture), X1 can be incorporated into the substrate, for example during the synthesis of the substrate or during the shaping of the substrate, X1 can also be introduced onto the substrate, for example by impregnation of the previously shaped substrate. X1 can also be introduced partially during the synthesis or shaping of the substrate and partially by deposition on the shaped substrate. 30% to 70% by weight, preferably 40% to 65% by weight, and even more preferably 50% to 65% by weight, of the total quantity of X1 that is part of the composition of the catalyst according to the invention is thus introduced into the substrate or deposited on the substrate during this first introduction stage.

The X1 fraction that is introduced during the synthesis of the substrate is incorporated by any technique that is known to one skilled in the art. Without being exhaustive, the techniques for addition before or during the dissolution of the oxide precursors of the substrate, with or without curing, may be suitable. The introduction can therefore be done at the same time as or after the mixing of the precursors of the substrate.

According to a variant of the method for preparation according to the invention, the promoter X1 is introduced during the synthesis of the substrate according to a sol-gel-type technique. According to another variant, the promoter X1 is added to an alumina sol.

According to a third variant implementation of the invention, the promoter X1 is introduced during the shaping of the substrate according to the techniques of the prior art for shaping the substrate such as the procedures for shaping by extrusion or by the drop (oil-drop according to English terminology) coagulation.

In the case where the X1 fraction is deposited on the substrate, after its shaping, it can be impregnated by means of any technique that is known to one skilled in the art, and preferably by impregnation of a solution that contains one or more precursors of X1. The impregnation can be carried out by excess solution or else under dry conditions (the volume of solution containing X1 corresponding to the pore volume of the substrate). The impregnation can be carried out in the presence of radicals acting on the interaction between the precursor of the promoter X1 and the substrate. These radicals can be, for example, and without being limiting, mineral acids (HCl, HNO3) or organic acids (carboxylic acid types or polycarboxylic acid types), and complexing-type organic compounds, as is described in, for example, the U.S. Pat. Nos. 6,872,300 B1 and 6,291,394 B1. Preferably, the impregnation is carried out according to any technique that is known to one skilled in the art, making it possible to obtain a homogeneous distribution of the promoter X1 within the catalyst.

The precursors of the promoter X1 can be minerals or of organometallic type, optionally of water-soluble organometallic type. X1 is preferably selected from among the elements germanium and tin. The precursors that contain germanium can be selected from among at least one of the following reagents, without being exhaustive: oxides, tetra-alkoxides and fluorides of germanium. One example of an organo-soluble organometallic compound is the oxide $(EtGeO)_2O$. In the case of tin, various precursors can be used, alone or in a mixture. In particular, tin can be selected and, in a non-limiting way, in the group that is formed by the halogenated compounds, hydroxides, carbonates, carboxylates, sulfates, tartrates and nitrates. These forms of the tin can be introduced into the medium of preparation of the catalyst as is or generated in situ (for example, by introduction of tin and carboxylic acid). The tin-based precursors of organometallic type can be, for example, $SnR4$, where R represents an alkyl group, for example the butyl group, $Me_3SnCl$, $Me_2SnCl_2$, $Et_3SnCl$, $Et_2SnCl_2$, $EtSnCl_3$, $iPrSnCl_2$, and the hydroxides $Me_3SnOH$, $Me_2Sn(OH)_2$, $Et_3SnOH$, $Et_2Sn(OH)_2$, the oxides $(Bu_3Sn)_2O$, and the acetate $Bu_3SnOC(O)Me$. Preferably, the halogenated, in particular chlorinated, tin radicals will be used. In particular, $SnCl_2$ or $SnCl_4$ will be used advantageously.

Regardless of the variant that is used for the introduction of a fraction of the promoter X1 during stage a, it may be preferred to carry out a drying of the substrate (stage b) at the end after the promoter is added. This drying can be carried out according to any technique that is known to one skilled in the art, for example at a temperature of between 40° C. and 200° C., preferably between 80° C. and 180° C. This drying can be carried out with a programming of temperature and optionally can comprise temperature stages.

Whereby the promoter X1 has been introduced into the substrate or on the previously formed substrate, the protocol for preparation of the catalysts according to the invention generally requires calcination before the deposit of the metal M from the platinum group (stage c). This calcination is preferably conducted at a temperature of between 350 and 650° C., and preferably between 400 and 600° C., and even more preferably between 400 and 550° C. The rise in temperature can be uniform or can include intermediate temperature stages, whereby these stages are reached with fixed or variable rates of temperature increase. These increases in temperatures can therefore be identical or can differ by their rate (by degree per minute or per hour). The gas atmosphere that is used during the calcination contains oxygen, preferably between 2 and 50%, and more preferably between 5 and 25%. Air can therefore also be used during this calcination stage.

After obtaining the substrate that contains an X1 fraction relative to the final composition of the catalyst, a deposit of metal from the platinum group M is made (stage d). In this stage, the metal M can be introduced by dry impregnation or excess solution, by using a precursor or a mixture of precursors containing a metal from the platinum group. The impregnation can be carried out in the presence of radicals that act on the interaction between the precursor of the metal M and the substrate. These radicals can be, without being limiting, mineral acids (HCl, HNO3) or organic acids (carboxylic acid or polycarboxylic acid types), and complexing-type organic compounds. Preferably, the impregnation is carried out according to any technique that is known to one skilled in the art that makes it possible to obtain a homogeneous distribution of the metal M within the catalyst.

The precursors of the metal M are part of the following group, without this list being limiting: hexachloroplatinic acid, bromoplatinic acid, ammonium chloroplatinate, platinum chlorides, platinum dichlorocarbonyl dichloride, and tetraamine platinum chloride.

At this stage, the substrate that contains X1 (a fraction of the targeted total quantity of X1 in the final catalyst) and platinum is optionally dried (stage e), under neutral atmosphere or atmosphere containing oxygen (with the air that can be used), at a moderate temperature and preferably not exceeding 150° C. Preferably, the drying is implemented at a temperature of less than 100° C. and over a period of several minutes to several hours.

At the end of this possible drying stage, a complementary fraction of the promoter X1 is deposited on the product that is obtained in stage d or e (stage f). More specifically, for the introduction of the radical X1 (used by itself or in a mixture) regarding this stage, 30% at least and 70% at most, and preferably 35% at least and 60% at most, and very preferably 35% at least and 50% at most, of the total quantity of X1 entering into the composition of the catalyst according to the invention is thus introduced during this second stage (stage f) for introduction of X1. The complementary fraction of the promoter X1 is deposited by bringing into contact a solution that contains the precursor.

In this stage, and in the case of the tin precursors, the tin tetrachloride SnCl4 will be used exclusively. In the case of the germanium precursors, the germanium tetrachloride GeCl4 will be used exclusively.

An optional drying of the product that is obtained in stage f can then be performed (stage g), under neutral atmosphere or atmosphere containing oxygen (with the air that can be used), at a moderate temperature.

This stage is then generally followed by a calcination of the product that is obtained in stage f or g (stage h). This calcination is preferably conducted in the presence of air. This air can also be enriched with oxygen or nitrogen. Preferably, the oxygen content of this gas reaches 0.5 to 30% and even more preferably 2 to 25%.

This calcination is conducted at a temperature that occurs between 350 and 600° C. and preferably between 400 and 550° C., and even more preferably between 450 and 550° C. The temperature slope should be uniform and adequately fast. It can optionally contain temperature stages starting at 350° C. The rate of temperature increase is preferably greater than or equal to 5° C./minute. This rate of temperature increase can be greater than 10° C./minute. Preferably, this temperature increase rate will not be less than 2° C./minute.

The optional promoter X2 can be introduced at one or more stages of the preparation of the catalyst. It can be introduced, for example, before, during or after the first stage for introduction of X1 (stage a, during the shaping of the substrate or by deposition on the substrate), by itself or in a mixture. X2 can also be introduced between the calcination stage of the substrate (stage c) and the introduction stage of the metal from the platinum group (stage d). Another possibility for introducing X2 is to incorporate it before the addition of the second X1 fraction (stage f); it can finally be introduced before the final calcination stage (stage h). The promoter X2 can be introduced once or several times, provided that it complies with the introduction conditions cited above. The promoter X2 can also be introduced by impregnation during an additional stage (stage i) that is located after stage h; stage i is then generally followed by stages j and k respectively for drying and calcination of the catalyst under the detailed conditions presented above for the stages for drying e or g or for calcination h.

In the case where a promoter X2 is present, the preparation process according to the invention can therefore also and advantageously comprise an additional stage for introduction of a promoter X2 that is located before stage a, or between stage c and stage d, or just before stage f or stage h, or else after stage h.

The optional promoter X2 can be introduced by means of any technique that is known to one skilled in the art. The ionic exchanges, dry impregnations or excess solution impregnations are suitable when it is a matter of deposition on the substrate (modified by X1 or not). In the case of incorporation during the preparation of the substrate, the promoter X2 can be added by mixing, co-precipitation, or dissolution without being limiting. In the case of gallium, indium, and thallium, nitrates or halides can be used. Regarding indium, precursors, by themselves or in a mixture, of nitrate, chlorides or bromides of indium are suitable. Other precursors can also be used.

When the various precursors that are used in the preparation of the catalyst according to the invention do not contain halogen or contain halogen in an insufficient quantity, it may be necessary to add a halogenated compound during the preparation. Any compound that is known to one skilled in the art can be used and incorporated into any of the stages for the preparation of the catalyst according to the invention. In particular, it is possible to use Friedel and Crafts-type compounds, such as aluminum chloride or aluminum bromide, iron chloride or iron bromide, or zinc chloride. It is also possible to use organic compounds, such as methyl or ethyl halides, for example dichloromethane, chloroform, dichloroethane, methyl chloroform or carbon tetrachloride.

Chlorine can also be added to the catalyst according to the invention by means of an oxychlorination treatment. Such a treatment can be carried out, for example, at 500° C. for 4 hours under a flow rate of 100 liters per hour of air that contains the quantity of gaseous chlorine that is necessary for depositing the desired quantity of chlorine and a quantity of water with an H2O/Cl molar ratio that is close to, for example, 20.

The chlorine can also be added by means of an impregnation by an aqueous solution of hydrochloric acid. A typical protocol consists in impregnating the solid so as to introduce the desired quantity of chlorine. The catalyst is kept in contact with the aqueous solution for a sufficiently long period to deposit this quantity of chlorine, then the catalyst is centrifuged and dried at a temperature of between 80 and 150° C., then finally calcined under air at a temperature of between 450° C. and 600° C.

The invention also relates to a process for catalytic reforming of a hydrocarbon feedstock in the presence of the catalyst according to the invention.

The catalyst according to the invention can actually be used in processes for reforming gasolines and for production for aromatic compounds.

The reforming processes make it possible to increase the octane number of gasoline fractions that are obtained from the distillation of the crude oil and/or other refining processes, such as, for example, catalytic cracking or thermal cracking.

The processes for the production of aromatic compounds provide base products (benzene, toluene, xylenes) that can be used in petrochemistry. These processes have an additional advantage in contributing to the production of large quantities of hydrogen that is essential for the processes of hydrogenation and hydrotreatment of the refinery. These two types of processes are differentiated by the selection of operating conditions and the composition of the feedstock that are known to one skilled in the art.

The feedstock of the reforming processes generally contains paraffinic, naphthenic and aromatic hydrocarbons that contain 5 to 12 carbon atoms per molecule. This feedstock is defined, among other things, by its density and its composition by weight. These feedstocks can have an initial boiling point that is between 40° C. and 70° C. and a final boiling point that is between 160° C. and 220° C. They can also consist of a fraction or a mixture of gasoline fractions that have initial and final boiling points of between 40° C. and 220° C. The feedstock can thus also consist of a heavy naphtha that has a boiling point of between 160° C. and 200° C.

Typically, the reforming catalyst is charged into a unit and previously subjected to a reduction treatment. This reduction stage is generally carried out under dilute or pure hydrogen atmosphere and at a temperature that is advantageously between 400° C. and 600° C., preferably between 450° C. and 550° C.

The feedstock is then introduced into the presence of hydrogen and with a hydrogen/hydrocarbon molar ratio for the feedstock of generally between 0.1 and 10, preferably between 1 and 8. The operating conditions of the reforming are generally as follows: a temperature preferably between 400° C. and 600° C., more preferably between 450° C. and 540° C., and a pressure of preferably between 0.1 MPa and 4 MPa, and more preferably between 0.25 MPa and 3.0 MPa. All or part of the hydrogen that is produced can be recycled at the inlet of the reforming reactor.

EXAMPLES

The following examples illustrate the invention.

Example 1 (Invention)

Preparation of the Catalyst A SnPtSn/Al2O3-Cl

A catalyst A that contains 0.3% by weight of platinum, 0.4% by weight of tin, and 1% by weight of chlorine, deposited on a gamma-alumina substrate whose specific surface area is 200 m²/g, is prepared.

200 cm³ of an aqueous solution that contains tin dichloride is added to 100 g of alumina substrate in the presence of hydrochloric acid. It is left in contact for 4 hours, filtered, dried at 120° C., and then calcined for 2 hours at 500° C. at an air flow rate of 100 liters per hour. The quantity of tin dichloride is selected so as to obtain 0.2% by weight of tin on the calcined product. The solid is then brought into contact with 400 cm³ of an aqueous solution of hexachloroplatinic acid and hydrochloric acid. It is left in contact for 4 hours, and then it is centrifuged. It is dried at 90° C., and then it is brought into contact with 200 cm³ of an aqueous solution that contains tin tetrachloride in the presence of hydrochloric acid. It is left in contact for 4 hours, filtered, dried at 120° C., and then calcined for 2 hours at 500° C. at an air flow rate of 100 liters per hour, with a temperature increase rate of 7° C. per minute. The quantity of tin tetrachloride is selected so as to obtain 0.4% by weight of tin in all on the calcined product.

Example 2 (Invention)

Preparation of the Catalyst B SnPtSn/Al2O3-Cl

A catalyst B is prepared according to the operating mode that is described in Example 1 by this time selecting the quantity of tin dichloride so as to obtain 0.27% by weight of tin on the calcined intermediate product, and the quantity of tin tetrachloride to be added so as always to obtain 0.4% tin on the final catalyst.

Example 3 (For Comparison)

Preparation of the Catalyst C SnPt/Al2O3-Cl

A catalyst C is prepared on the same substrate and with the same contents of tin, platinum, and chlorine as in Example 1.

200 cm³ of an aqueous solution that contains tin dichloride is added to 100 g of alumina substrate in the presence of hydrochloric acid. It is left in contact for 4 hours, filtered, dried at 120° C., and then it is calcined for 2 hours at 500° C. at an air flow rate of 100 liters per hour. The quantity of tin dichloride is selected so as to obtain 0.4% by weight of tin on the calcined product. The solid is then brought into contact with 400 cm³ of an aqueous solution of hexachloroplatinic acid and hydrochloric acid. It is left in contact for 4 hours, and then it is centrifuged. It is dried at 120° C., and then it is calcined for 2 hours at 500° C. at an air flow rate of 100 liters per hour, with a temperature increase rate of 7° C. per minute.

Example 4 (For Comparison)

Preparation of a Catalyst D SnPtSn/Al2O-Cl

A catalyst C is prepared according to the operating method that is described in Example 1, with the sole difference being that during the two tin impregnations, the precursor that is used is an aqueous solution that contains tin dichloride in the presence of hydrochloric acid.

Example 5 (Invention)

Preparation of the Catalyst E SnPtInSn/Al2O3-Cl

A catalyst E is prepared on the same substrate as in Example 1 by depositing 0.3% by weight of platinum, 0.4% by weight of tin, 0.2% by weight of indium, and 1% by weight of chlorine. 200 cm$^3$ of an aqueous solution that contains tin dichloride is added to 100 g of alumina substrate in the presence of hydrochloric acid. It is left in contact for 4 hours, filtered, dried at 120° C., and then calcined for 2 hours at 500° C. at an air flow rate of 100 liters per hour. The quantity of tin dichloride is selected so as to obtain 0.2% by weight of tin on the calcined product. The solid is then brought into contact with 400 cm$^3$ of an aqueous solution of hexachloroplatinic acid and hydrochloric acid. It is left in contact for 4 hours and then centrifuged. It is dried at 90° C., and then it is brought into contact with 300 cm$^3$ of an aqueous solution that contains indium nitrate in the presence of hydrochloric acid. Again, it is left in contact for 4 hours, centrifuged, dried, and then it is brought into contact with 200 cm$^3$ of an aqueous solution that contains tin tetrachloride in the presence of hydrochloric acid. It is left in contact for 4 hours, centrifuged, dried at 120° C., and then it is calcined for 2 hours at 500° C. at an air flow rate of 100 liters per hour, with a temperature increase rate of 7° C. per minute. The quantity of tin tetrachloride is selected so as to obtain 0.4% by weight of tin in all on the calcined product.

Example 6 (Invention)

Preparation of the Catalyst F PtSn/(Al2O3-Sn—In)—Cl

An alumina ball substrate, containing 0.2% by weight of tin and 0.2% by weight of indium, with a mean diameter of 1.2 mm, having a BET surface area of 205 m2/g, is prepared by putting tin dichloride and indium trichloride in contact with an alumina hydrosol that is obtained by hydrolysis of aluminum chloride. The thus obtained alumina hydrosol is then sent into a vertical column that is filled with oil that is used as an additive. The thus obtained spheres are treated thermally up to 600° C. so as to obtain balls with good mechanical strength.

A catalyst F is prepared on this substrate by depositing 0.3% by weight of platinum, 0.2% by additional weight of tin so as to obtain 0.4% by weight of tin and 1% by weight of chlorine on the final catalyst.

400 cm$^3$ of an aqueous solution of hexachloroplatinic acid and hydrochloric acid are added to 100 g of the alumina substrate that contains tin and indium. It is left in contact for 4 hours, and then it is centrifuged. It is dried at 90° C., and then it is brought into contact with 200 cm$^3$ of an aqueous solution of tin tetrachloride in the presence of hydrochloric acid. It is left in contact for 4 hours, centrifuged, dried at 120° C., and then it is calcined for 2 hours at 500° C. at an air flow rate of 100 liters per hour, with a temperature increase rate of 7° C. per minute. The quantity of tin tetrachloride is selected so as to obtain 0.4% by weight of tin in all on the calcined product.

Example 7 (Invention)

Preparation of the Catalyst G SnInPtSn/Al2O3

A catalyst G is prepared on the same substrate as in Example 1 by depositing 0.3% by weight of platinum, 0.4% by weight of tin, 0.2% by weight of indium, and 1% by weight of chlorine. 200 cm$^3$ of an aqueous solution that contains tin dichloride is added to 100 g of alumina substrate in the presence of hydrochloric acid. It is left in contact for 4 hours, filtered, dried at 120° C., and then it is calcined for 2 hours at 500° C. at an air flow rate of 100 liters per hour. The quantity of tin dichloride is selected so as to obtain 0.2% by weight of tin on the calcined product. The solid is then brought into contact with 300 cm$^3$ of an aqueous solution that contains indium nitrate in the presence of hydrochloric acid. Again, it is left in contact for 4 hours, centrifuged, and the solid is dried. The solid is then brought into contact with 400 cm$^3$ of an aqueous solution of hexachloroplatinic acid and hydrochloric acid. It is left in contact for 4 hours, and then it is centrifuged. It is dried at 90° C., and then it is brought into contact with 200 cm$^3$ of an aqueous solution that contains tin tetrachloride in the presence of hydrochloric acid. It is left in contact for 4 hours, centrifuged, dried at 120° C., and then it is calcined for 2 hours at 500° C. at an air flow rate of 100 liters per hour, with a temperature increase rate of 7° C. per minute. The quantity of tin tetrachloride is selected so as to obtain 0.4% by weight of tin in all on the calcined product.

Example 8

Evaluation of the Performance Levels of the Catalysts A to G in Catalytic Reforming The bimetallicity index values and the Hir/Pt atomic ratio values of the catalysts A to G of Examples 1 to 7 have been determined according to the methods that are presented in the detailed description and are indicated in Table 1.

Samples of the catalysts whose preparations have been described in Examples 1 to 7 have been used in a reaction bed that is suited to the conversion of a naphtha-type hydrocarbon feedstock, obtained from the distillation of petroleum. This naphtha accepts the following composition (by weight):
40.5% of paraffinic compounds,
45.1% of naphthenes,
14.4% of aromatic molecules, for a total density of 0.757 g/cm3.

The research octane number of the feedstock is close to 55.

After loading into the reactor, the catalysts are activated by heat treatment under pure hydrogen atmosphere, during a period of 2 hours at 490° C.

TABLE 1

Characteristics and Performance Levels of the Catalysts A to G

| Catalyst | BMI (%) | Hir/Pt | Yield of Reformate (% by Weight) | Research Octane Number RON | Yield of Aromatic Compounds (% by Weight) | C1-C4 Yield (% by Weight) |
|---|---|---|---|---|---|---|
| A (Invention) | 115 | 0.52 | +0.45% | 101.9 | +0.2 | −0.3 |
| B (Invention) | 111 | 0.55 | Base | 102.3 | Base | Base |
| C (Prior Art) | 103 | 0.65 | −0.95 | 101.9 | −0.85% | +1.1 |

TABLE 1-continued

Characteristics and Performance Levels of the Catalysts A to G

| Catalyst | BMI (%) | H$_{tr}$/Pt | Yield of Reformate (% by Weight) | Research Octane Number RON | Yield of Aromatic Compounds (% by Weight) | C1-C4 Yield (% by Weight) |
|---|---|---|---|---|---|---|
| D (Prior Art | 109 | 0.34 | −0.85% | 101.9 | −0.9% | +0.75% |
| E (Invention) | 130 | 0.50 | +1.4% | 102.0 | +1.25% | −1.50% |
| F (Invention) | 122 | 0.51 | +1.3% | 101.9 | +1.1% | −1.4% |
| G (Invention) | 133 | 0.49 | +1.7% | 102.2 | +1.4% | −1.8 |

The evaluation of the catalytic performance levels is carried out under reforming reaction conditions, in the presence of hydrogen and naphtha described above. In particular, the conditions of use and comparison of the catalysts are as follows:

Pressure of the reactor kept at 8 barg (0.8 MPaG),
Feedstock flow rate of 2.0 kg/h per kg of catalyst,
Hydrogen/hydrocarbon molar ratio of the feedstock: 4

The comparison is carried out with research octane number iso quality of liquid effluents (called reformates) that result from the catalytic conversion of the feedstock. The comparison is carried out for a research octane number of 102.

The invention claimed is:

1. A catalyst that comprises a metal M from the platinum group, at least one promoter X1 from the group of tin, germanium, and lead, a halogenated compound, and a porous substrate, in which the X1/M atomic ratio is between 0.3 and 8, the H$_{tr}$/M ratio that is measured by hydrogen adsorption is more than 0.40, and the bimetallicity index BMI that is measured by hydrogen/oxygen titration is more than 108, produced by a process comprising the following sequential steps:
  a) Introduction of a fraction of the promoter X1 into the substrate or on the substrate,
  c) Calcination of the product that is obtained in stage a,
  d) Deposition on resultant calcined product of step (c) of at least one metal from the platinum group M,
  e) Optional drying under neutral atmosphere or atmosphere containing oxygen, at a moderate temperature,
  f) Deposition of a complementary fraction of the promoter X1 on the product that is obtained in stage d or e, and
  h) Calcination of the product that is obtained in stage f with at least one of the following provisions for providing halogen to the catalyst: at least one of promoter X1 and metal of platinum group M is a precursor containing halogen; or there is introduced a halogenated compound or a halogen at one or more stages.

2. A catalyst according to claim 1, also comprising at least one promoter X2 from the group of gallium, indium, and thallium, whereby the X2/M ratio is between 0.3 and 8.

3. A catalyst according to claim 2, in which the (X1+X2)/M ratio is between 0.3 and 8.

4. A catalyst according to claim 2, in which the X1/M ratio is between 1.0 and 2.9, and the X2/M ratio is between 0.9 and 4.

5. A catalyst according to claim 2, comprising a promoter X1 and a promoter X2 and in which X1 is tin and X2 is indium.

6. A catalyst according to claim 2, wherein said at least one promoter X1 is tin, said at least one promoter X2 is indium and said metal M from the platinum group is platinum.

7. A catalyst according to claim 1, in which the X1/M atomic ratio is between 0.6 and 6.

8. A catalyst according to claim 1, comprising only one promoter X1 and in which X1 is tin.

9. A catalyst according to claim 8, in which the phosphorus content is between 0.01 and 5% by weight.

10. A catalyst according to claim 1, in which the catalyst also comprises phosphorus.

11. A catalyst according to claim 1, in which the H$_{tr}$/M ratio is between 0.43 and 0.9.

12. A catalyst according to claim 1, in which the H$_{tr}$/M ratio is between 0.45 and 0.65.

13. A catalyst according to claim 1, in which the bimetallicity index BMI that is measured by hydrogen/oxygen titration is greater than 115.

14. A catalyst according to claim 1, in which the bimetallicity index BMI that is measured by hydrogen/oxygen titration is between 110 and 160.

15. A catalyst according to claim 14, wherein the BMI is between 115 and 145.

16. A catalyst according to claim 1, in which the halogen is selected from the group of: fluorine, chlorine, bromine and iodine.

17. A catalyst according to claim 1, in which the halogen is chlorine and the catalyst contains 0.5 to 2% by weight of chlorine.

18. A process comprising conducting catalytic reforming of a hydrocarbon feedstock wherein the catalyst is according to claim 1.

19. A catalyst according to claim 1, wherein said promoter consists of at least one of tin, germanium and lead, and optionally gallium, indium and thallium.

20. A process for preparation of a catalyst that comprises a metal M from the platinum group, at least one promoter X1 from the group of tin, germanium, and lead, a halogenated compound, and a porous substrate, in which the X1/M atomic ratio is between 0.3 and 8, the H$_{tr}$/M ratio that is measured by hydrogen adsorption is more than 0.40, and the bimetallicity index BMI that is measured by hydrogen/oxygen titration is more than 108, said process comprising the following stages:
  a) Introduction of a fraction of the promoter X1 into the substrate or on the substrate,
  c) Calcination of the product that is obtained in stage a,
  d) Deposition on resultant calcined product of step (c) of at least one metal from the platinum group M,
  e) Optional drying under neutral atmosphere or atmosphere containing oxygen, at a moderate temperature,
  f) Deposition of a complementary fraction of the promoter X1 on the product that is obtained in stage d or e,
  h) Calcination of the product that is obtained in stage f with at least one of the following provisions for providing halogen to the catalyst: at least one of promoter X1 and metal of platinum group M is a precursor containing halogen, or there is introduced a halogenated compound or a halogen at one or more stages.

21. A process for preparation according to claim 20, also comprising a stage b for drying the product that is obtained at the end of stage a.

22. A process for preparation according to claim 20, also comprising, before stage h, a stage g for drying the product that is obtained at the end of stage f.

23. A process for preparation according to claim 20, in which a promoter X2 is introduced at one or more stages of the preparation that are selected from among the stages a, d, and f.

24. A process for preparation according to claim 20, also comprising an additional stage for introduction of a promoter X2 that is located before stage a, or between stage c and stage d, or just before stage f or stage h, or else after stage h.

25. A process for preparation according to claim 20, in which 30% at least and 70% at most of the total quantity of X1 that enters into the composition of the catalyst according to the invention is introduced during the second stage f for introducing X1.

26. A process according to claim 20, wherein said calcination of step (c) is conducted at between 350° and 650° C., the optional drying of step (e) does not exceed 150° C. and the calcination in step (h) is conducted in the presence of air optionally enriched with oxygen or nitrogen.

27. A process according to claim 20, wherein $SnCl_2$ is added as a promoter in step (a) and the complementary fraction is added in step (f) as $SnCl_4$.

28. A catalyst consisting of a metal M from the platinum group, at least one promoter X1 from the group consisting of tin, germanium and lead, and optionally in addition to X1, a promoter X2 selected from the group consisting of gallium and thallium, wherein the atomic ratio of X1/M and X2/M is between 0.3 and 8, the $H_{tr}/M$ ratio that is measured by hydrogen adsorption is more than 0.40, and the bimetallicity index BMI that is measured by hydrogen/oxygen titration is more than 108, and wherein catalytically active metals and promoters consist of tin, germanium and lead, and optionally gallium, indium and thallium.

* * * * *